(12) United States Patent
Berendsen et al.

(10) Patent No.: US 10,362,724 B2
(45) Date of Patent: Jul. 30, 2019

(54) SOWING MACHINE WITH MULTIFUNCTIONAL ROLLER

(71) Applicant: LEMKEN GmbH & Co .KG, Alpen (DE)

(72) Inventors: Mark Berendsen, Lengel (NL); Dennis Bergerfurth, Rees (DE); Martin Gebbeken, Alpen (DE); Marcel Geraats, Nettetal (DE); Christian Gotzen, Viersen (DE); Thomas Lukas, Ahaus-Wuellen (DE); Christian Paessens, Issum (DE); Dieter Werries, Alpen (DE)

(73) Assignee: LEMKEN GMBH & CO.KG, Alpen (DE)

( * ) Notice: Subject to any disclaimer, the term of this patent is extended or adjusted under 35 U.S.C. 154(b) by 95 days.

(21) Appl. No.: 15/030,026

(22) PCT Filed: Oct. 15, 2014

(86) PCT No.: PCT/DE2014/100369
§ 371 (c)(1),
(2) Date: Apr. 15, 2016

(87) PCT Pub. No.: WO2015/055182
PCT Pub. Date: Apr. 23, 2015

(65) Prior Publication Data
US 2016/0278279 A1 Sep. 29, 2016

(30) Foreign Application Priority Data
Oct. 15, 2013 (DE) .................. 10 2013 111 357

(51) Int. Cl.
*A01C 5/06* (2006.01)
*A01C 7/06* (2006.01)

(52) U.S. Cl.
CPC ................ *A01C 7/06* (2013.01); *A01C 5/064* (2013.01); *A01C 5/068* (2013.01)

(58) Field of Classification Search
CPC ........... A01C 5/064; A01C 5/062; A01C 5/06; A01C 5/00; A01C 5/068; A01C 5/066; A01C 7/06; A01C 7/00
See application file for complete search history.

(56) References Cited

U.S. PATENT DOCUMENTS 4,244,306 A 1/1981 Peterson et al.
4,624,196 A 11/1986 Anderson

FOREIGN PATENT DOCUMENTS

CA 2927659 10/2014
CL 201600872 5/2017
(Continued)

OTHER PUBLICATIONS

200 Series advanced seed meter planters, Jul. 18, 2005, XP055170737, retrieved from the internet: URL:http://www.caseih.com/en_us/Products/PlantingSeeding/Documents/Brochures/1200_Series_Advacnced_Seed_Meter_Planters_Brochure_CIH3080406.pdf.

*Primary Examiner* — Christopher J. Novosad
(74) *Attorney, Agent, or Firm* — HM Law Group LLP; Vani Moodley, Esq.

(57) ABSTRACT

Viewed in the direction of travel, fertilizer coulters and swivel-mounted seed coulters (13) are arranged at coulter arms (40) on the frame (6) of a pneumatic precision seed drill. Between them there is a working device designed as a roller (15), which is designed for the re-compaction of the soil thrown up by the fertilizer coulter (12), the pre-compaction of soil between the working device (14) and seed coulter (13), and as a depth guidance roller for the precision seed drill.

16 Claims, 5 Drawing Sheets

(56) References Cited

FOREIGN PATENT DOCUMENTS

Figure 1:
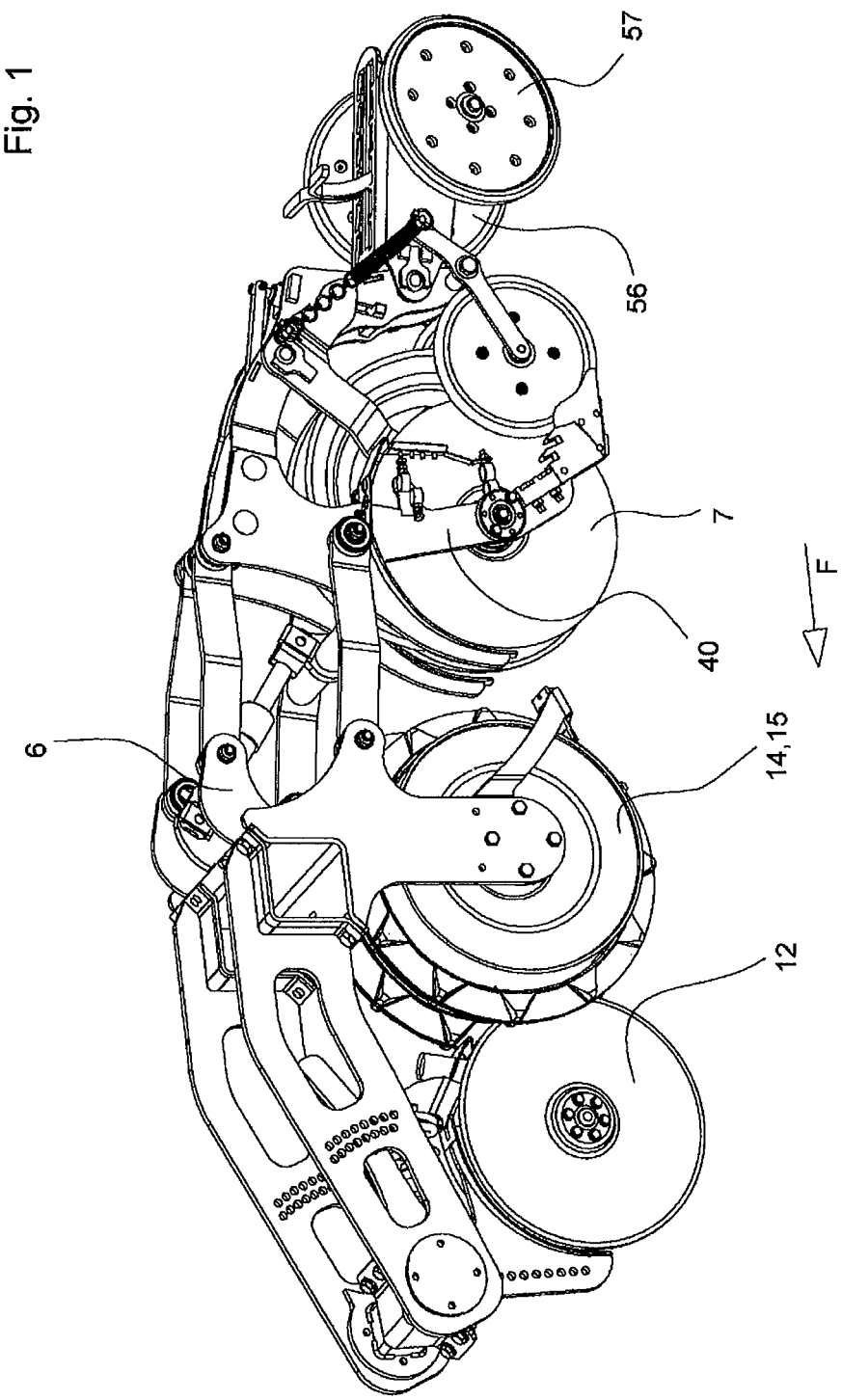

| | | | |
|---|---|---|---|
| CN | 2587146 | Y | 11/2003 |
| CN | 2587146 | Y | 11/2003 |
| CN | 2750635 | Y | 1/2006 |
| CN | 2750635 | Y | 1/2006 |
| CN | 101305656 | A | 11/2008 |
| CN | 201403281 | Y | 2/2010 |
| CN | 101305656 | B | 6/2010 |
| CN | 203105089 | U | 8/2013 |
| CN | 201480065772 | | 10/2014 |
| DE | 1782477 | A | 8/1971 |
| DE | 2535703 | A1 | 2/1977 |
| DE | 19731862 | A1 | 1/1999 |
| DE | 102007028193 | A1 | 12/2008 |
| DE | 201310111357 | | 10/2013 |
| EP | 20055811 | A2 | 5/2008 |
| EP | 2374343 | A1 | 10/2011 |
| EP | 20140805779 | | 10/2014 |
| FI | 44964 | B | 1/1971 |
| FR | 2 624 686 | A1 | 6/1989 |
| FR | 2624686 | A1 | 6/1989 |
| JP | 2005-117913 | A | 5/2005 |
| JP | 2016523298 | A | 10/2014 |
| WO | 2005/065440 | A1 | 7/2005 |
| WO | 2005065440 | A1 | 7/2005 |
| WO | WO-2005065440 | A1 * | 7/2005 ........... A01B 73/044 |

\* cited by examiner

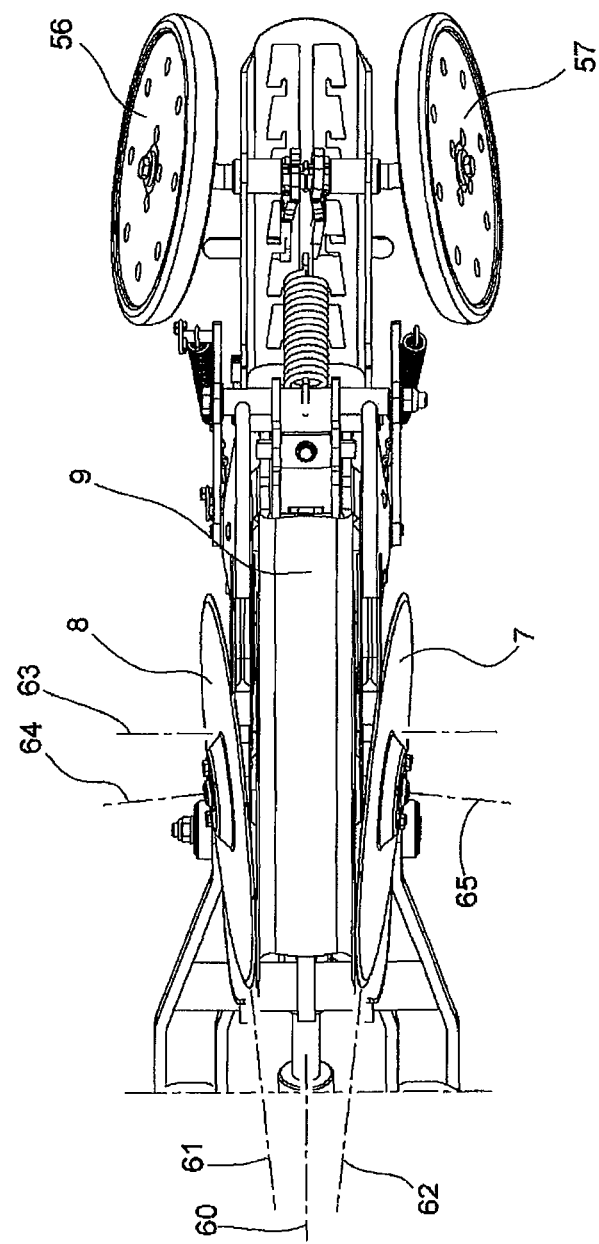

SOWING MACHINE WITH MULTIFUNCTIONAL ROLLER

The invention concerns an arrangement of coulters on the frame of an agricultural device, preferably the arrangement of fertiliser coulters and swivel-mounted double disc coulters on coulter arms on the frame of a seed drill, preferably a pneumatic seed or precision seed drill.

Pneumatic precision seed drills are used in agriculture in order to plant the seeds into the ground individually and at even distances. The European patent application EP2374343A1 shows for example a precision seeder unit of a precision seed drill, which has an upstream spring-mounted fertiliser coulter. The soil thrown up by the fertiliser coulter impairs the function and the depth guidance of the following seed coulter. The seed is placed inaccurately relative to the floor covering i.e. to the fertiliser band deposited by the fertiliser coulter. This results in a varying accumulation of the germinating seeds and thus in losses in yield.

The present invention thus confronts the task of creating an arrangement of coulters for an agriculturally deployed machine, in particular to create a precision seed drill that makes do with a minimum of units and enables optimal seed placement onto a deposited fertiliser band.

This issue is resolved by the fact that a working device designed as a roller or compactor is located between the fertiliser coulter and double disc coulter, which is designed to close the fertiliser coulter slit, re-compact the soil thrown up by the fertiliser coulter, and to act as a depth guidance device for the precision seed drill.

Between the fertiliser coulter and the seed coulter designed as a double disc coulter there is a multifunctional work device in the form of a roller or compactor, which in a first function, facing forwards, catches the majority of what is thrown up from the fertiliser coulter out of the fertiliser groove and then re-compacts it above the fertiliser band, i.e. closes the fertiliser coulter slit again. The working device is also responsible for another important function if the working device is designed as a depth guidance device for the precision seed drill. In this function, the working device provides depth guidance for the precision seed drill and thus performs the function of separate frame guidance wheels, making them superfluous as a result.

As a further function, the working device finally serves for the pre-compaction of soil before the double disc coulter and thus can also work backwards. The roller or compactor thus acts as a pre-compacting tool for the double disc coulter positioned behind it and as a seed groove in the process. The roller hereby fulfils a beneficial dual function with regards to the post-compaction for the upstream fertiliser coulter and the pre-compaction of the following double disc coulter.

The working device is additionally intended to be equipped as a roller with a majority of parallel rings that protrude over the length of the roller, i.e. the outer length of the roller and/or the outside length of the roller. For the re-compaction for the fertiliser coulter and pre-compaction for the double disc coulter, it is advisable to equip the roller with a majority of parallel rings, preferably with two rings that correspond with the fertiliser/seed groove in their arrangement and design and thus have a significant influence and ensure the multiple functions mentioned.

With regard to the shape of these rings, the most important aspect is that they exhibit a V-shaped, U-shaped or circular shaped cross-section in their effective range on the ground.

Such a ring thus necessarily tapers outwards to a point in the manner of a roof. In order to reinforce the described effects described, it is intended that the rings shall exhibit multiple floor drive elements distributed along their length and stretching in their axial direction, preferably wedges. About twelve of the wedges per ring are evenly distributed roughly on both sides. These wedges additionally strengthen and optimise the functions in the context of post and pre-compacting.

As far as the shaping of the wedges is concerned, the idea is to design the wedges as a trapezium, which itself extends along the whole depth of the rings on the roller. Therefore the longer base side of the trapezium comes together with the inner edge of the ring and/or with the transition of ring/roller, and the shorter base side of the trapezium with the tapered outside edge of the ring.

A further favourable feature of the invention proposes that the roller exhibits two centrically spaced apart partial rollers or a centric recess, within the range of which the fertiliser coulters protrude at least with the rear ends. This means two partial rollers to each other or the central recess in the roller are positioned and dimensioned in such a manner that the fertiliser coulters arranged as a pair and the recess of the roller or between the two partial rollers interlinks to a certain extent. This produces a certain cleaning effect and/or for the prevention of the accumulation of soil in this area.

In addition to this it is intended that the roller at the centric recess bordering on both sides or the partial roller on the inside exhibit a ring. Viewed from the outside looking inwards, this working device is thereby set up in such a manner that a normal roller section is arranged on the outside, which is followed by a ring and then the recess on the inside.

An additional execution form of the invention proposes that an arrangement of preferably two double disc coulters follow the roller, whereby the effective area of the double disc coulters in the floor would exhibit roughly the same average distance in lateral direction as the average distance of the rings.

A further focus of the invention lies in the fact that an arrangement of two double disc coulters and a depth guidance roller follows the roller, whereby in direction of travel the depth guidance roller is arranged between the two double disc coulters, and the two double disc coulters and the depth guidance roller perform a rotating motion in the same direction. This construction unit in the form of two double disc coulters with depth guidance roller positioned between them is shifted forwards between the two double disc coulters and turns in the same direction. The respective arrangement aids soil being cast off to the side, prevents for the most part soil being thrown up into the centre and thus practically rules out blockages.

A supplemental suggestion proposes that the depth guidance roller and the two neighbouring double disc coulters are arranged or designed at least approximately touching the depth guidance roller in order to achieve the addressed effects in an improved manner.

This arrangement is particularly beneficial if the axle of the double disc coulter and the axle of the depth guidance roller viewed in direction of travel are at least at the same height, so are minimally offset at most.

In order to ensure that the double disc coulter and depth guidance roller actually turn in the same direction under utilisation of the aforementioned advantages, it is intended that the axle of the double disc coulter lies within the range of the depth guidance roller so as to ensure such an equal movement. Alternatively it would make sense for the axle of the depth guidance roller to lie within the range of the double disc coulters in order to ensure the mentioned similar guidance of the two.

A further measure plans for the double disc coulters pairs to be arranged facing diagonally forward in the direction of travel in order to optimally prevent soil from getting in between coulters and depth guidance roller.

Consideration is in particular given to the fact the two discs forming a double disc coulter are employed in different degrees of inclination to each other and/or to the direction of travel, i.e. the inner seed discs are engaged at a smaller angle than the outer ones.

A preferential execution form plans that the internal discs of the respective double disc coulters are arranged at least approximately parallel to the rotation level of the depth guidance roller in order to avoid soil being thrown up in the area of the depth guidance roller.

In order to be able to plant the seeds into the ground separately and at even distances it is recommended that one or more grain sorting mechanisms are assigned to the paired arrangement of double disc coulters, in particular if the sorting mechanism is formed at its outer edge with another connected pair of sorting adjuster, which for the generation of a spread out seed row in tangential direction to each other are arranged offset and are assigned separate outlets for the discharge of the seed out of the seeding heart in the direction of the seed coulter. A spread seed row can be explained by the fact that this row of deposited seed grains next to a more or less even longitudinal distance exhibits a defined, right and left alternating lateral distance to the centre of the row.

If the average distance of the outlets and/or the connected lines at least approximately correspond to the lateral distance of the seed row then the seed will be preferably be led vertically downwards and thereby without notable collisions into the area of the seed placement with the outlet or tube inner wall. The direction reversal of the seeds within the discharge pipe is reduced to a minimum and avoids unnecessary collision delays during the seed transport, thereby simultaneously significantly increasing placement accuracy within the seed row.

The invention is characterised in particular by the fact that a multi-functional working device for an agricultural machine is created that ensures a simpler structure of such a machine, because a working device designed as a roller or compactor helps to assume several functions for the machine and thus saves on tools. The device can be used to support or supplement the units deployed to the front or to the back. This working device assumes the responsibility as the closing element of the fertiliser groove, which leaves behind the upstream fertiliser coulter. Furthermore, the nature of the working device invention means it can operate as a pre-compacting tool for the seed groove and thus the following double disc coulter. This thereby improves capillary water supply into the ground to the seeds. At the same time, the arrangement makes a precise lateral and vertical positioning of the seed rows relative to the deposited fertiliser band by the fertiliser coulter possible. This promises plant-structural advantages in the form of better seed placement, improved nutrient uptake in the ground and thus higher plant yields. Owing to a further function of this working device, a separate depth guidance device is also not necessary.

Figure 2:
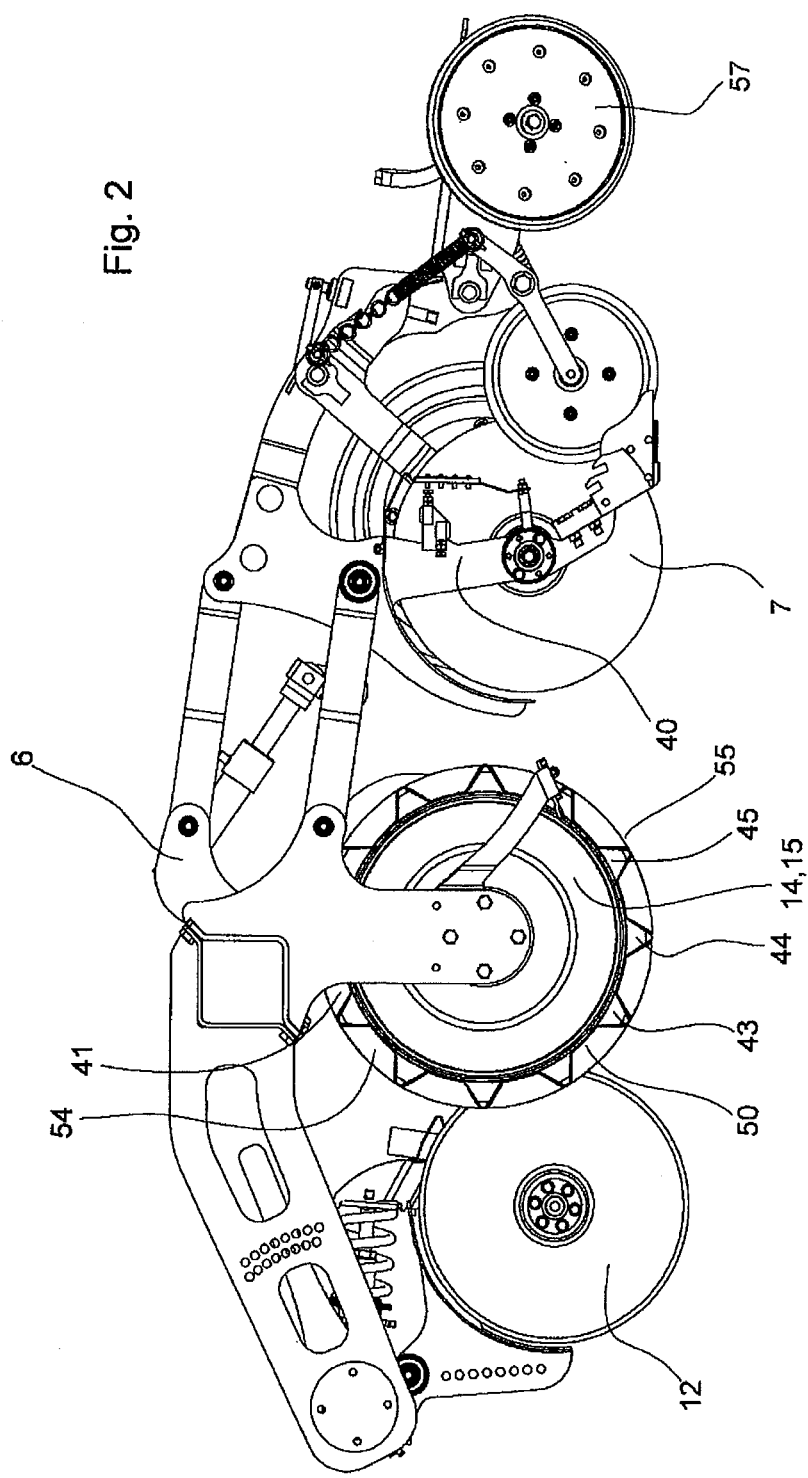
Figure 3:
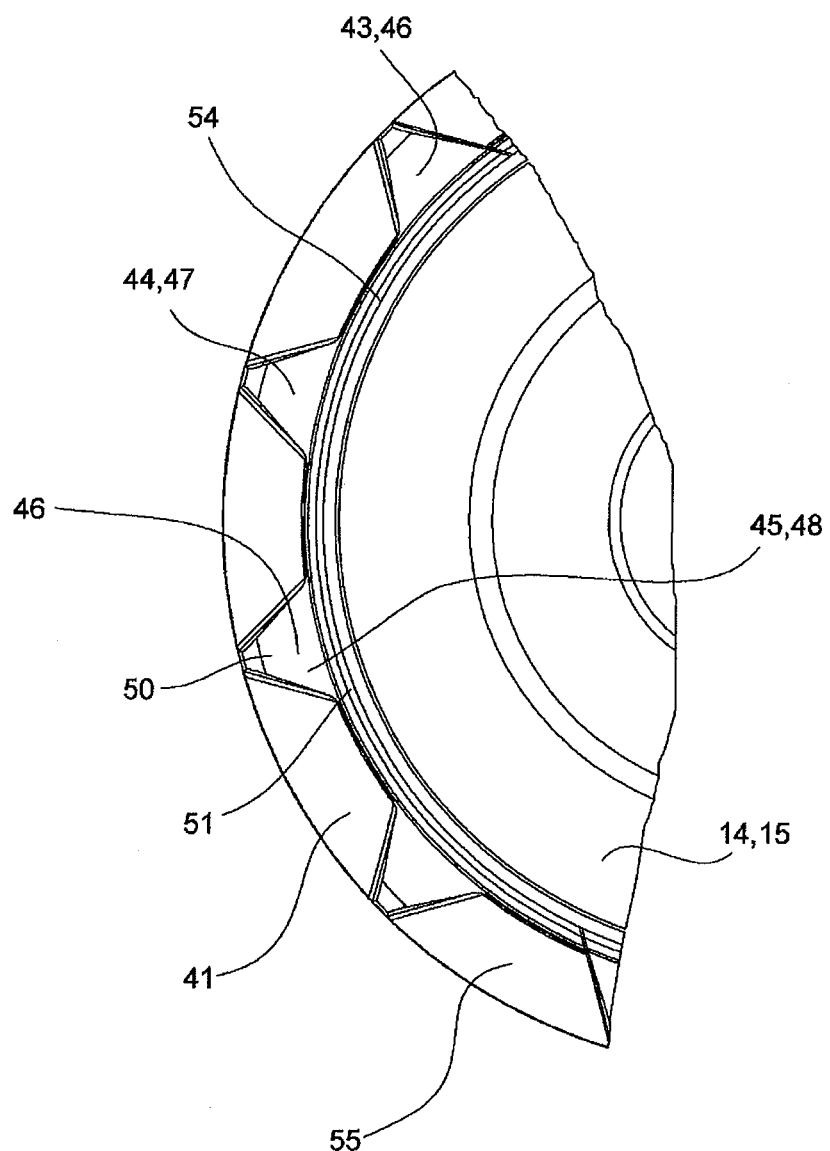
Figure 4:
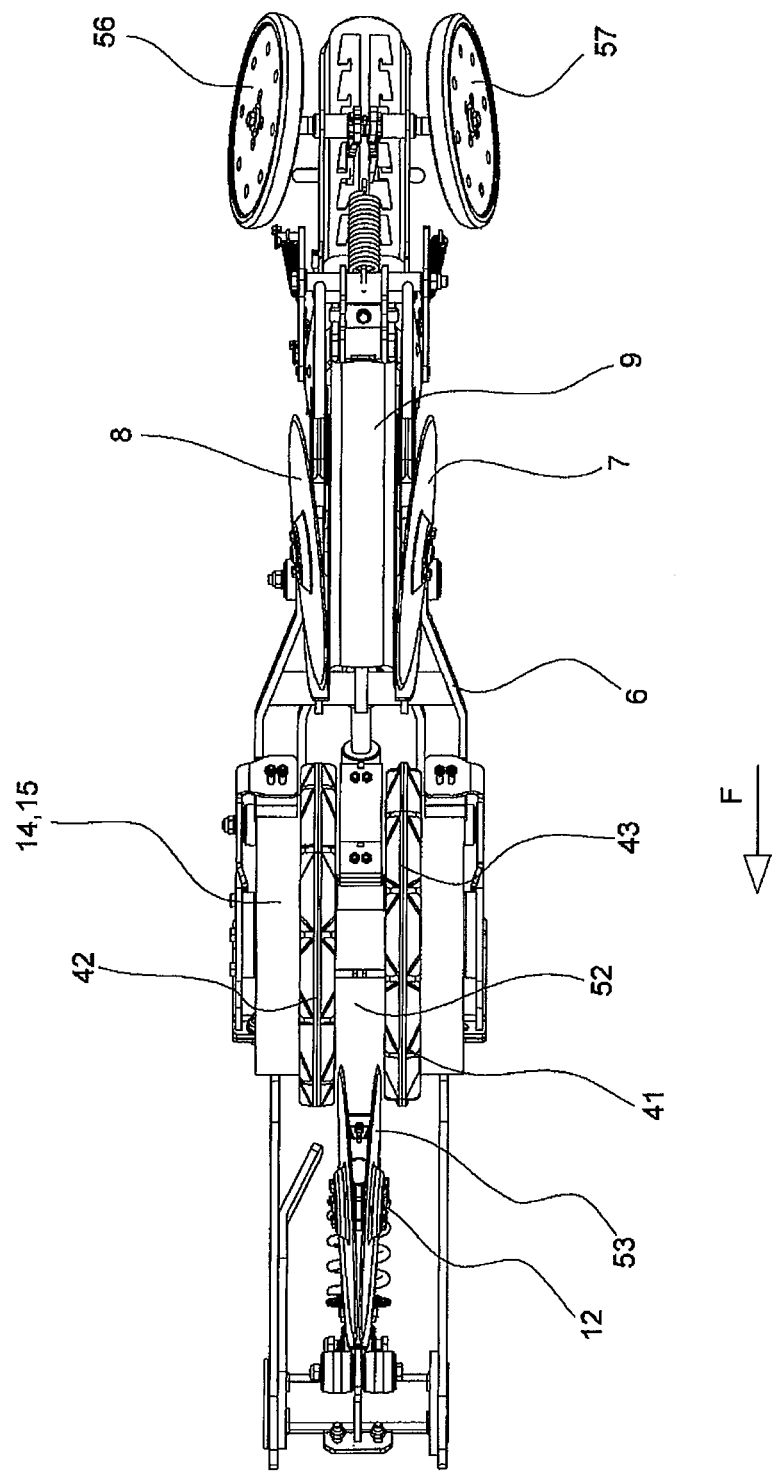

Further details and advantages of the invention result from the following description of the respective drawing, in which a preferred example of implementation is illustrated with the necessary details and individual parts. It shows:

FIG. 1 The section of a seed drill with the special units of the invention in a perspective view, FIG. 2 In side view, FIG. 3 An enlarged display of the rings and wedges, FIG. 4 A view of the machine section from the bottom and FIG. 5 A section of FIG. 4.

FIG. 1 shows the section of a precision seed drill with the frame 6, at which, viewed in direction of travel F, a fertiliser coulter 12, a working device 14 designed as a roller 15, and seed coulters 7, 8 designed as double disc coulters are arranged, the latter located on a swivellable and height-adjustable coulter arm and with pressure applicable. This ensemble is followed by another pair of pressure rollers 56, 57. Many of these frames 6 are attached laterally spaced onto the not depicted pipe frame of a precision seed drill. The fertiliser coulter 12 is a double disc coulter with an inside lying discharge pipe for liquid or solid fertiliser. The fertiliser coulter 12 can be designed as movable, spring-loaded and/or height-adjustable to the working device 14. Additionally, a cleaning device can be mounted upstream in front of the fertiliser coulter 12 for the removal of plant remains or foreign bodies.

In the side view, this frame 6 is displayed with the units in FIG. 2, whereby it is clearly evident that the fertiliser coulter 12 encroaches upon the roller 15 to a certain extent. The latter exhibits two rings beyond the actual range 54 of the roller protruding out or forming this range, of which the left ring 41 can be recognised here. On the ring 41, twelve wedges are arranged in its and thus also the roller's 15 axial direction, which are marked by way of example with the reference symbols 43, 44 and 45 and are designed as trapeziums 46, 47, 48, which, viewed from inside to outside, taper to a point. For the purpose of a better overview, the seed coulter 7 designed as a double disc coulter is not displayed in FIG. 2.

An enlarged display of the roller, rings and wedges can be found in FIG. 3. Beyond the actual range 54, the tapered ring 41 extends beyond the actual range 54 of the roller 14 with a number of shafts here exemplarily denoted with the reference symbols 43, 44 and 45. Such a trapezium 48 extends from its longer base side/inner edge 51 tapered to the outside to its shorter base side/outside edge 50, which in turn coincides with the outside edge 55 of the ring 41.

FIG. 4 shows the machine section in the view from below with a view in particular of the transition between fertiliser coulter 12 and roller 15. The latter exhibits a central recess 52 or consists of two partial rollers, which serve to take up the rear end 53 of the fertiliser coulters 12 in order to ensure a mutual cleaning effect and to largely rule out the accumulation of soil. The recess 52 is followed by a ring 41, 42 on both sides with the profile as described in detail in FIGS. 2 and 3. Seen from these rings 41, 42 outwards, the roller 15 itself then follows with a smaller diameter than the rings 41, 42.

A better view of the device section is offered in FIG. 5. The two double disc coulters 7 and 8 are positioned diagonally in the direction of travel, the axles 64, 65 of the double disc coulters 7, 8 and the axle 63 of the depth guidance roller 9 are positioned accordingly. The angle at which the double disc coulters 7, 8 are arranged also corresponds with that of the longitudinal axis 60 of the device section to the two longitudinal axes 61 and 62 of the double disc coulters 7 and 8.

The invention claimed is:

1. An arrangement of a fertilizer coulter structure and a plurality of swivel-mounted double disc seed coulters (7, 8), wherein each of the plurality of swivel-mounted double disc seed coulters is mounted on at least one of a plurality of coulter arms (40), wherein the plurality of coulter arms are fixed on a frame (6) of a pneumatic seed drill, wherein the arrangement further comprises:

a working device (14) which is designed as a roller (15) or a compactor situated between the fertilizer coulter structure and the swivel-mounted double disk seed coulters (7, 8), wherein the working device (14) is configured to: close a slit of the fertilizer coulter structure, to re-compact soil thrown up by the fertilizer coulter structure, pre-compact soil in front of the swivel-mounted double disc seed coulters (7, 8) and to act as a depth guidance device for the pneumatic seed drill.

2. The arrangement according to claim 1, wherein the roller (15) includes a plurality of parallel rings (41, 42) protruding and forming an outer scope of the roller (15) along a scope (54) of the roller (15).

3. The arrangement according to claim 2, wherein the plurality of parallel rings (41, 42) in their effective range at ground have a V-shaped, U-shaped or circular cross-section.

4. The arrangement according to claim 3, wherein the plurality of parallel rings (41, 42) exhibit a plurality of floor drive elements arranged and extending in an axial direction in the form of a plurality of wedges (43, 44, 45).

5. The arrangement according to claim 4, wherein the plurality of wedges (43, 44, 45) are shaped as a trapezium (46, 47, 48) and extends over an entire circumference of the plurality of parallel rings (41, 42).

6. The arrangement according to claim 2, wherein the fertilizer coulter structure comprises a pair of fertilizer coulters (12), wherein the roller (15) includes two partial rollers spaced centrically to one another and forming a centric recess (52), and wherein the pair of fertilizer coulters (12) extend inside the recess (52) at least with their rear end (53).

7. The arrangement according to claim 6, wherein the roller (15) and the two partial rollers are placed at an inner side of the plurality of parallel rings (41, 42).

8. The arrangement according to claim 7, wherein the roller (15) follows an arrangement of the swivel-mounted double disc seed coulters (7, 8), wherein an effective area of the swivel-mounted double disc seed coulters (7, 8) in the ground is equal to the average distance in lateral direction as an average distance of the plurality of parallel rings (41, 42).

9. The arrangement according to claim 1, wherein the roller (15) follows an arrangement of two of the swivel-mounted double disc seed coulters (7, 8) and a depth guidance roller (9), wherein the depth guidance roller (9), in direction of travel, is arranged between the two swivel-mounted double disc seed coulters (7, 8), and wherein the arrangement of the two swivel-mounted double disc seed coulters (7, 8) and the depth guidance roller (9) exert a rotating motion in the direction of travel.

10. The arrangement according to claim 9, wherein an axle (36) of the swivel-mounted double disc seed coulters (7, 8) and an axle (37) of the depth guidance roller (9) are located at the same height.

11. The arrangement according to claim 9, wherein an axle (36) of the two swivel-mounted double disc seed coulters (7, 8) lies within a range of the depth guidance roller (9) and an axle (37) of the depth guidance roller (9) lies within a range of the two swivel-mounted double disc seed coulters (7, 8).

12. The arrangement according to claim 9, wherein the two swivel-mounted double disc seed coulters (7, 8) are arranged facing diagonally forward in the direction of travel.

13. The arrangement according to claim 9, wherein the swivel-mounted double disc seed coulters (7, 8) include two discs which are arranged at different degrees of inclination.

14. The arrangement according to claim 13, wherein an internal disc of the two discs forming the swivel-mounted double disc seed coulters (7,8) is arranged parallel to a rotation plane of the depth guidance roller (9).

15. The arrangement according to claim 9, wherein the swivel-mounted double disc coulters (7, 8) are configured to perform grain sorting mechanisms.

16. The arrangement according to claim 1, wherein an average distance of a plurality of outlets and/or a plurality of connected lines corresponds to a lateral distance of a seed row.

* * * * *